US010133009B1

United States Patent
Wu et al.

(10) Patent No.: US 10,133,009 B1
(45) Date of Patent: Nov. 20, 2018

(54) FIBER OPTIC ADAPTOR

(71) Applicants: Gloriole Electroptic Technology Corp., Kaohsiung (TW); Amphenol Fiber Optic Technology (Shenzhen) Co., Ltd., Shenzhen, Guangdong Province (CN)

(72) Inventors: Chia-Hua Wu, Kaohsiung (TW); Linghua Zhu, Shenzhen (CN)

(73) Assignees: Gloriole Electroptic Technology Corp., Kaohsiung (TW); Amphenol Fiber Optic Technology (Shenzhen), Guangdong Province (CN)

( * ) Notice: Subject to any disclaimer, the term of this patent is extended or adjusted under 35 U.S.C. 154(b) by 0 days.

(21) Appl. No.: 16/039,378

(22) Filed: Jul. 19, 2018

(30) Foreign Application Priority Data

Mar. 19, 2018 (TW) .............................. 107203487 U (51) Int. Cl.
*G02B 6/36* (2006.01)
*G02B 6/38* (2006.01)

(52) U.S. Cl.
CPC ......... *G02B 6/3825* (2013.01); *G02B 6/3882* (2013.01); *G02B 6/3893* (2013.01)

(58) Field of Classification Search
USPC ....................................................... 385/76–78
See application file for complete search history.

(56) References Cited

U.S. PATENT DOCUMENTS

| | | | |
|---|---|---|---|
| 5,016,968 A * | 5/1991 | Hammond | G02B 6/3831 385/78 |
| 8,403,569 B2 * | 3/2013 | Barnes | G02B 6/245 385/137 |
| 9,595,786 B1 * | 3/2017 | Takano | H01R 13/6275 |
| 2017/0097484 A1 * | 4/2017 | Teo | G02B 6/4284 |
| 2018/0217339 A1 * | 8/2018 | Ma | G02B 6/3893 |

* cited by examiner

*Primary Examiner* — Eric Wong
(74) *Attorney, Agent, or Firm* — LeClairRyan (57) ABSTRACT

A fiber optic adaptor includes two spaced apart engagement members protruding from a housing for connecting a ferrule member, and an auxiliary member disposed around the engagement members. The auxiliary member has a fixing portion and a moving portion. The moving portion is connected and movable relative to the fixing portion between pushing and non-pushing positions. When the moving portion is in the non-pushing position, the ferrule member is prevented from being detached from the engagement members. When the moving portion is in the pushing portion, the ferrule is allowed to be detached from the engagement members.

15 Claims, 10 Drawing Sheets

FIBER OPTIC ADAPTOR

CROSS-REFERENCE TO RELATED APPLICATION

This application claims priority of Taiwanese Patent Application No. 107203487, filed on Mar. 19, 2018.

FIELD

The disclosure relates to an adaptor, and more particularly to a fiber optic adaptor for a fiber optic connector.

BACKGROUND

Figure 1:
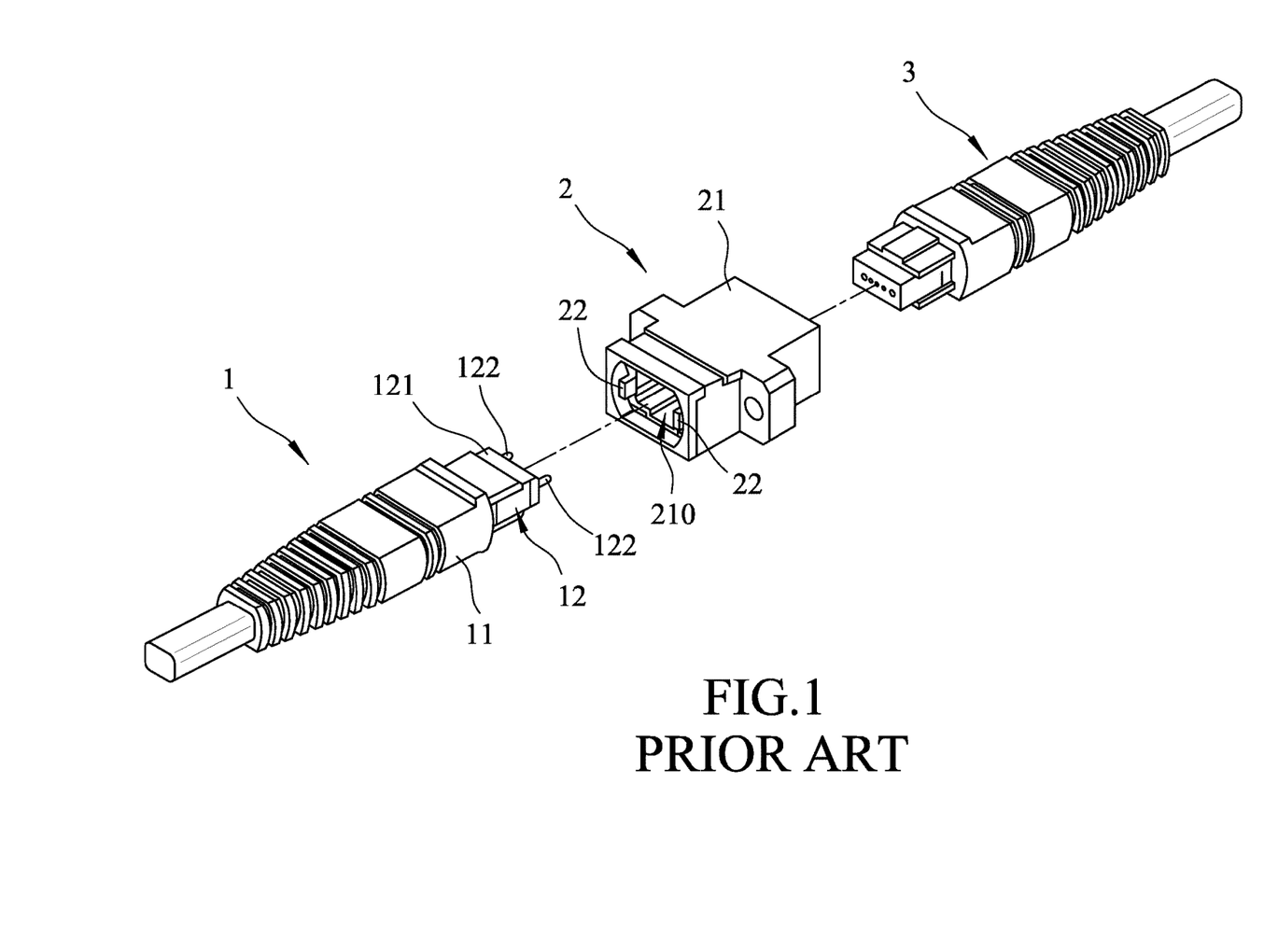
FIG. 1 is an exploded perspective view illustrating a conventional fiber optic adaptor connecting male and female fiber optic connectors.
Figure 2:
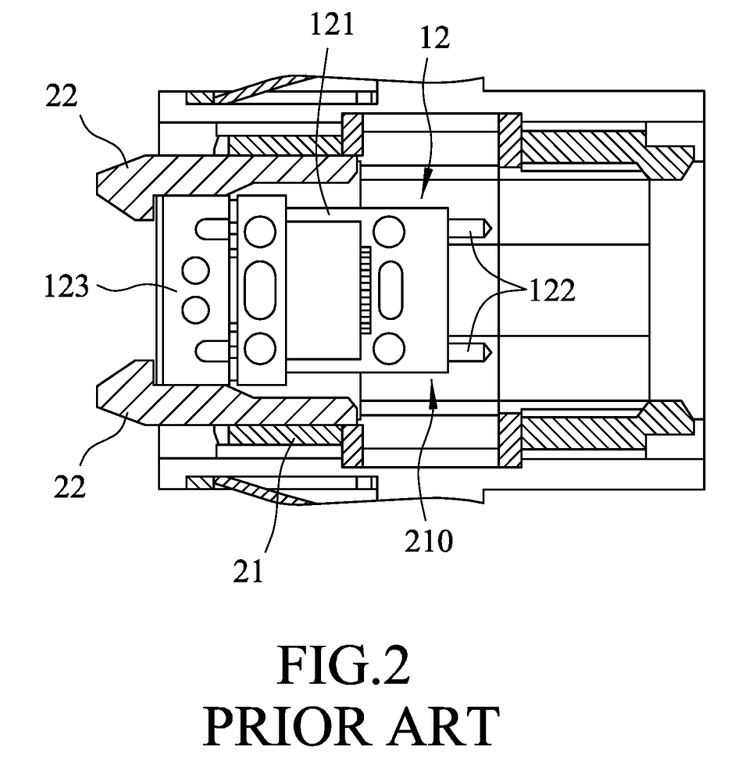
FIG. 2 is a top sectional view illustrating the male fiber optic connector inserted into the conventional fiber optic adaptor.

FIGS. 1 and 2 illustrate a conventional fiber optic adaptor 2 having two opposite ends for respectively inserting male and female multi-fiber push-on (MPO) connectors 1, 3. The male MPO connector 1 has a coupling body 11 and a ferrule member 12 disposed on an end of the coupling body 11. The ferrule member 12 has a ferrule main body 121, two spaced-apart plug pins 122 extending through the ferrule main body 121, and a pin retainer 123 disposed at an end of the ferrule main body 121 for securing the plug pins 122 to the ferrule main body 121. The conventional fiber optic adaptor 2 has a housing 21 formed with an insertion hole 210, and two spaced-apart barb-shaped engagement members 22 mounted to an inner surface of the housing 21 within the insertion hole 210.

When the male MPO connector 1 is inserted into the insertion hole 210, the ferrule member 12 pushes the barb-shaped engagement members 22 to move away from each other. After the ferrule member 12 extends through the barb-shaped engagement members 22 into the insertion hole 210, the barb-shaped engagement members 22 return to their original positions and abuttingly engage the pin retainer 123 to prevent the ferrule member 12 from being detached from the conventional fiber optic adaptor 2. While only the barb-shaped engagement members 22 are used to limit movement of the pin retainer 123, because a front end of the ferrule main body 121 opposite to the pin retainer 123 is generally mated to the female fiber optic connector 3, no additional means is required to position further the male MPO connector 1. However, to remove the male MPO connector 1 from the conventional fiber optic adaptor 2, because the pin retainer 123 is hooked by the barb-shaped engagement members 22, directly pulling out the male MPO connector 1 requires large pulling force which can damage the male MPO connector 1 and the conventional fiber optic adaptor 2. In addition, because the barb-shaped engagement members 22 are disposed inside the insertion hole 210, a tool is needed to push the barb-shaped engagement members 22 away from each other, thereby increasing inconveniences for removal of the male MPO connector 1.

SUMMARY

Therefore, an object of the disclosure is to provide a fiber optic adaptor that can alleviate at least one of the drawbacks of the prior art.

According to the disclosure, a fiber optic adaptor is provided for connecting a ferrule member that has a ferrule main body and a pin retainer disposed at an end of the ferrule main body. The fiber optic adaptor includes a housing, two engagement members, and an auxiliary member.

The engagement members protrude from the housing along a first direction and is spaced apart from each other along a second direction transverse to the first direction to clamp the pin retainer. Each of the engagement members has a barb element distal from the housing. The barb elements of the engagement members protrude toward each other.

The auxiliary member is disposed around the engagement members and has a fixing portion proximal to the housing, a moving portion proximal to the barb elements and movably connected to the fixing portion, and two pushers protruding from the moving portion towards the barb elements and spaced apart from each other along the second direction. The moving portion is movable relative to the fixing portion between pushing and non-pushing positions.

When the moving portion is in the non-pushing position, the pushers do not push the engagement members, and a minimum distance between the barb elements is smaller than a width of the pin retainer to prevent the ferrule member from being detached from the barb elements.

When the moving portion is in the pushing portion, the pushers respectively push the engagement members away from each other to allow detachment of the ferrule member from the barb elements.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
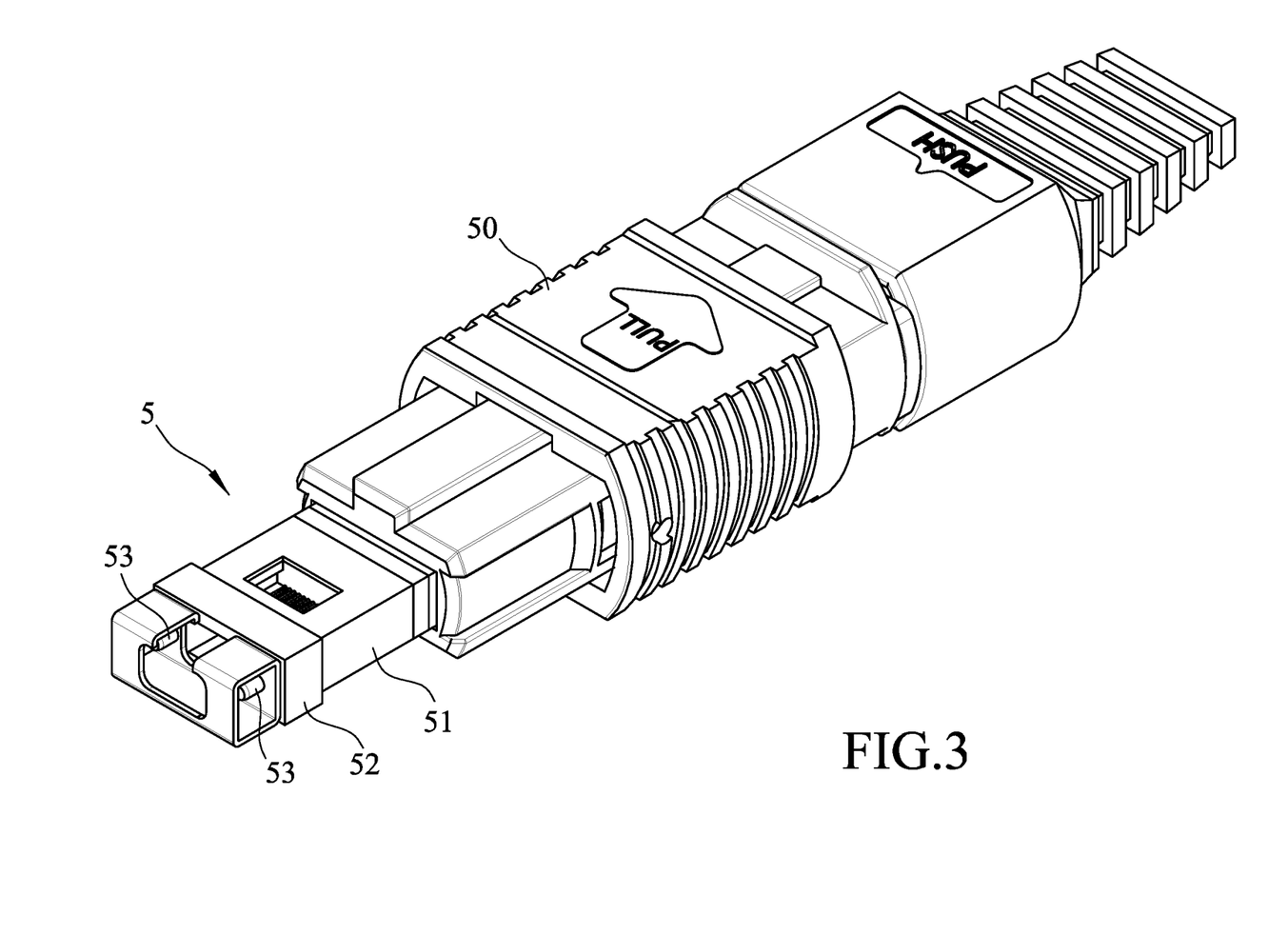
FIG. 3 is a perspective view illustrating a ferrule member connected to a fiber optic adaptor according to a first embodiment of the disclosure.
Figure 4:
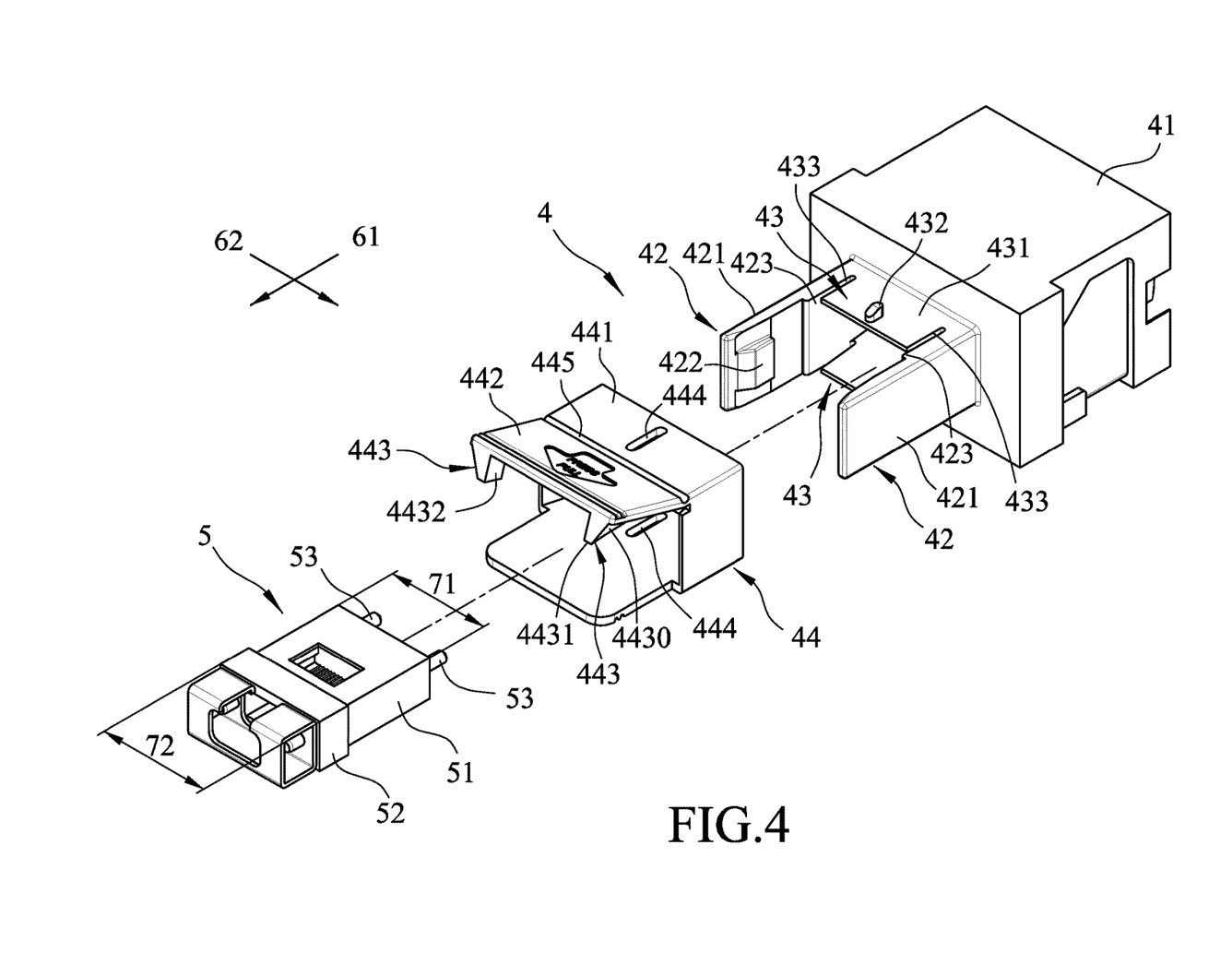
FIG. 4 is an exploded perspective view illustrating a fiber optic adaptor of the first embodiment for connecting the ferrule member.

FIGS. 3 and 4 illustrate a fiber optic adaptor 4 according to a first embodiment of the disclosure for connecting a ferrule member 5. The ferrule member 5 has a ferrule main body 51, a pin retainer 52 disposed at an end of the ferrule main body 51, and two spaced apart plug pins 53 inserted fixedly into the ferrule main body 51. The ferrule member 5 is a MT ferrule and is connected to an end of a male-type multi-fiber push-on connector 50. A width 71 of the ferrule main body 51 is smaller than a width 72 of the pin retainer 52.

Figure 5:
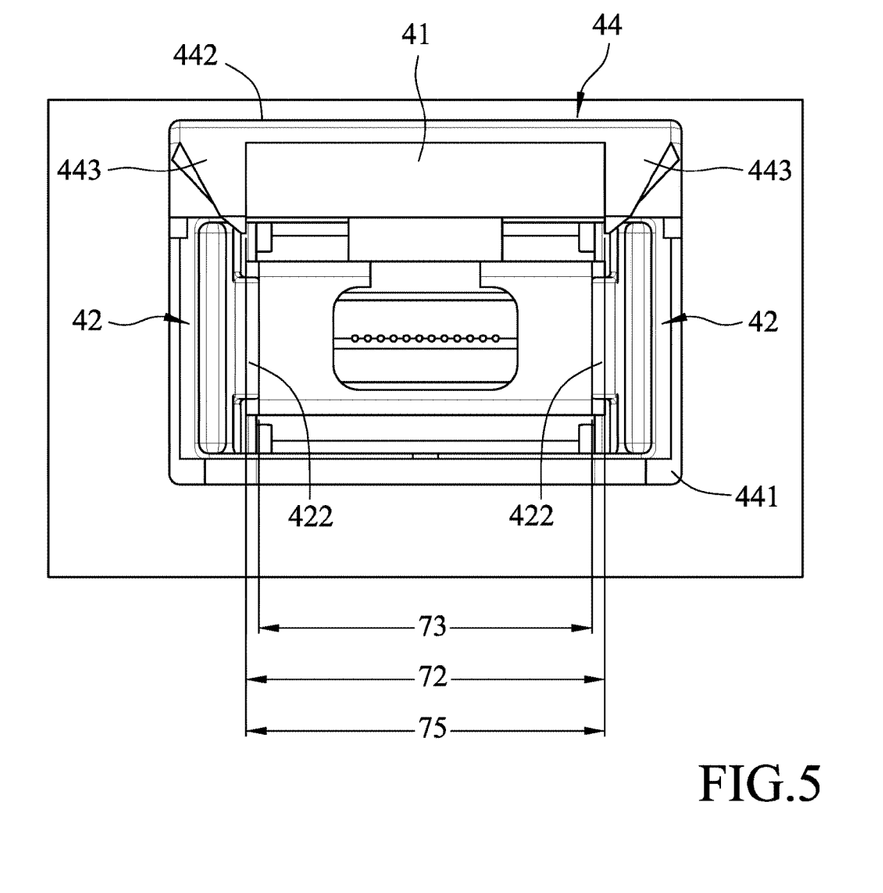
FIG. 5 is a front view of the fiber optic adaptor of the first embodiment in a non-pushing position when the ferrule is inserted thereinto.
Figure 6:
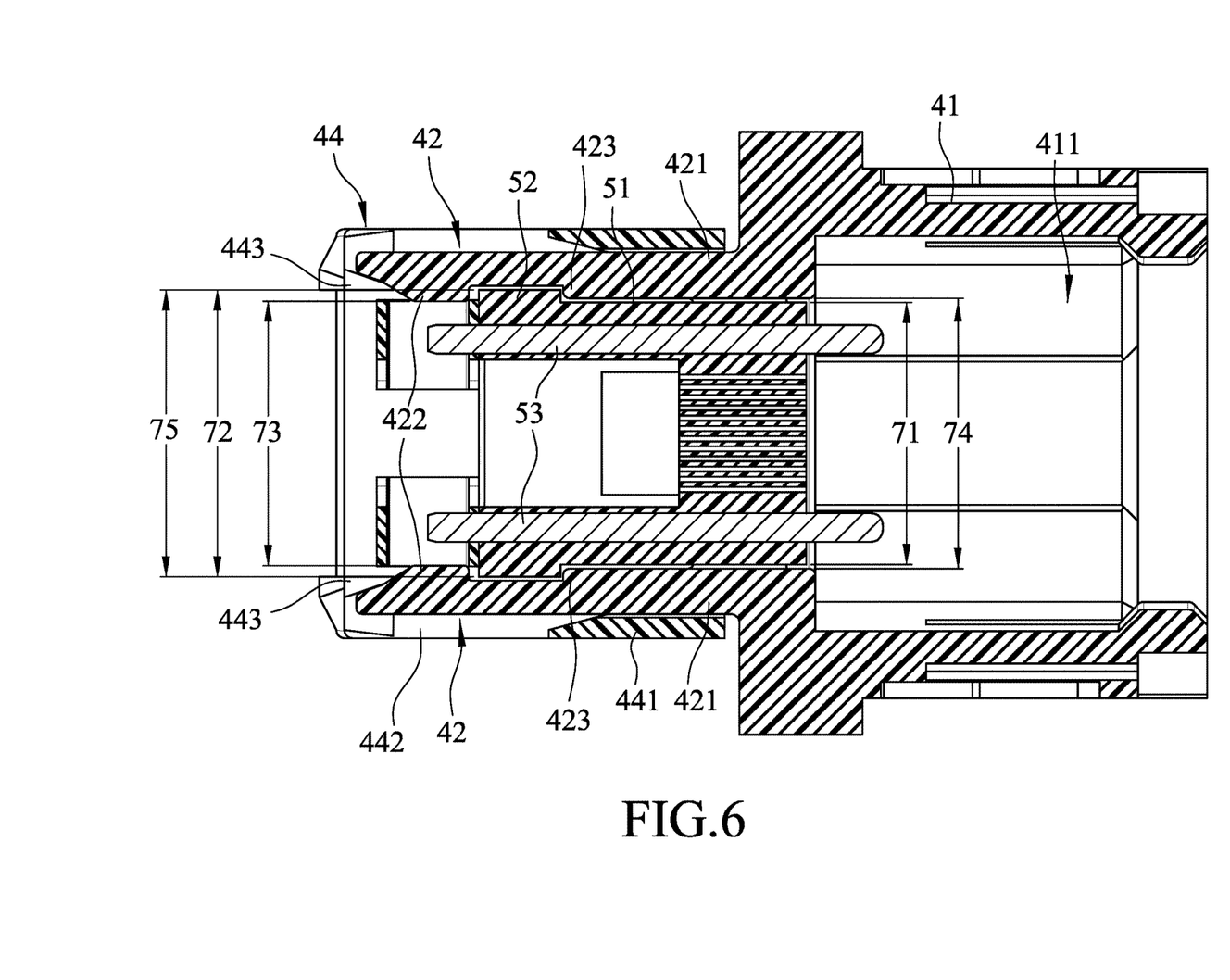
FIG. 6 is bottom sectional view of the first embodiment in the non-pushing position.

Referring to FIGS. 5 and 6 in combination with FIG. 4, the fiber optic adaptor 4 includes a housing 41, two engagement members 42, two spaced apart connection members 43, and an auxiliary member 44.

The housing 41 has an insertion hole 411 for insertion of a female fiber optic connector (not shown).

The engagement members 42 protrudes from the housing 41 along a first direction 61 and are spaced apart from each other along a second direction 62 transverse to the first direction 61. Each engagement member 42 is made from a plastic material and is bendable under pressure. In this embodiment, each engagement member 42 has an arm 421, a barb element 422, and a limit part 423. The arms 421 of the engagement members 42 protrude from the housing 41 along the first direction 61, and respectively have inner surfaces facing toward each other. The barb elements 422 of the engagement members 42 protrude inwardly and respectively from the inner surfaces of the arms 421, and are distal from the housing 41. The limit parts 423 of the engagement members 42 respectively protrude from the inner surfaces of the arms 421 proximally to the housing 41. Each limit part 423 is spaced apart from the corresponding barb element 422 in the first direction 61. A minimum distance 73 between the barb elements 422 is smaller than the width 72 of the pin retainer 52. A distance 74 between the limit parts 423 is greater than the width 71 of the ferrule main body 51, and is smaller than the width 72 of the pin retainer 52.

The connection members 43 protrude from the housing 41 between the engagement members 42 and are distal from the barb elements 422. In this embodiment, the connection members 43 respectively have outer surfaces 431, and studs 432 (only one shown in FIG. 4) that respectively protrude from the outer surfaces 431. Each connection member 43 has a plate shape and has two opposite ends respectively connected to the arms 421 of the engagement members 42 distally of the barb elements 422.

The fiber optic adaptor 4 further includes four junctions, where the connection members 43 connect the engagement members 42, and four slits 433 respectively formed at the junctions to facilitate outward bending movements of the arms 421. Each limit part 423 is connected to one of the two opposite ends of one of the connection members 43 at one of the junctions. Each slit 433 is formed between a portion of one of the limit parts 423 and a portion of one of the connection members 43.

The auxiliary member 44 has a fixing portion 441, a moving portion 442, and two pushers 443.

The fixing portion 441 extends around the engagement members 42 and the connection members 43, and is proximal to the housing 41. The outer surfaces 431 of the connection members 43 face an inner surface of the fixing portion 441. Two through holes 444 extend through inner and outer surfaces of the fixing portion 441. The studs 432 are respectively inserted into the through holes 444.

The moving portion is proximal to the barb elements 422 and is connected to the fixing portion 441. In addition, the auxiliary member 44 further has a hinging groove 445 that is formed between the fixing portion 441 and the moving portion 442 and that extends in the second direction 62. As such, the moving portion 442 is movable relative to the fixing portion 441 between a non-pushing position (see FIGS. 5 and 6) and a pushing position (see FIGS. 7 and 8).

The pushers 443 protrude from the moving portion 442 towards the barb elements 422 and are spaced apart from each other along the second direction 62. A distance 75 between the pushers 443 is greater than the minimum distance 73 between the barb elements 422. In this embodiment, while the distance 75 between the pushers 443 is equal to the width 72 of the pin retainer 52, the distance 75 between the pushers 443 can be greater than the width 72 of the pin retainer 52 in other embodiments. In addition, each pusher 443 is formed as a wedge-shaped protrusion. Specifically, each pusher 443 has a slanting surface 4430, a tapering end 4431 distal from the moving portion 442, and a pusher inner surface 4432. The pusher inner surfaces 4432 of the pushers 443 face each other. The slanting surfaces 4430 of the pushers 443 are respectively opposite to the pusher inner surfaces 4432 and convergingly extend from the moving portion 442 to the tapering ends 4431 of the pushers 443. The slanting surface 4430 of each pusher 443 is slidable on the inner surface of a respective one of the arms 421.

Referring to FIGS. 5 and 6, when the ferrule member 5 is inserted into the fiber optic adaptor 4, the pin retainer 52 pushes the barb elements 422 of the engagement members 42 and bends the engagement members 42 outwardly from each other. When the minimum distance 73 between the barb elements 422 is greater than the width 72 of the pin retainer 52, the pin retainer 52 passes the barb elements 422, and is limited by the limit parts 423 from moving further. Because the barb elements 422 return to their original positions, they abut and block the pin retainer 52.

As shown in FIGS. 4 to 6, when the ferrule member 5 is inserted into the fiber optic adaptor 4, the moving portion 442 of the auxiliary member 44 is in the non-pushing position and is inclined upward relative to the fixing portion 441. In the non-pushing position, the pushers 443 do not push the barb elements 422 of the engagement members 42, and the minimum distance 73 between the barb elements 422 is smaller than the width 72 of the pin retainer 52.

Figure 7:
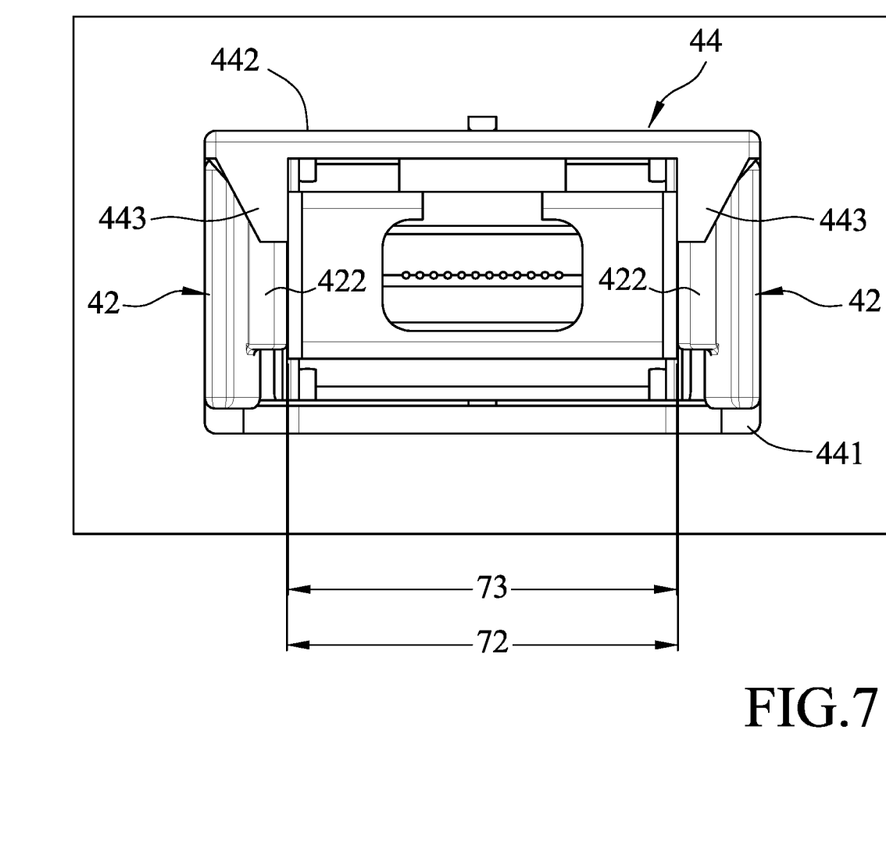
FIG. 7 is a front view of the first embodiment in a pushing position to remove the ferrule therefrom.
Figure 8:
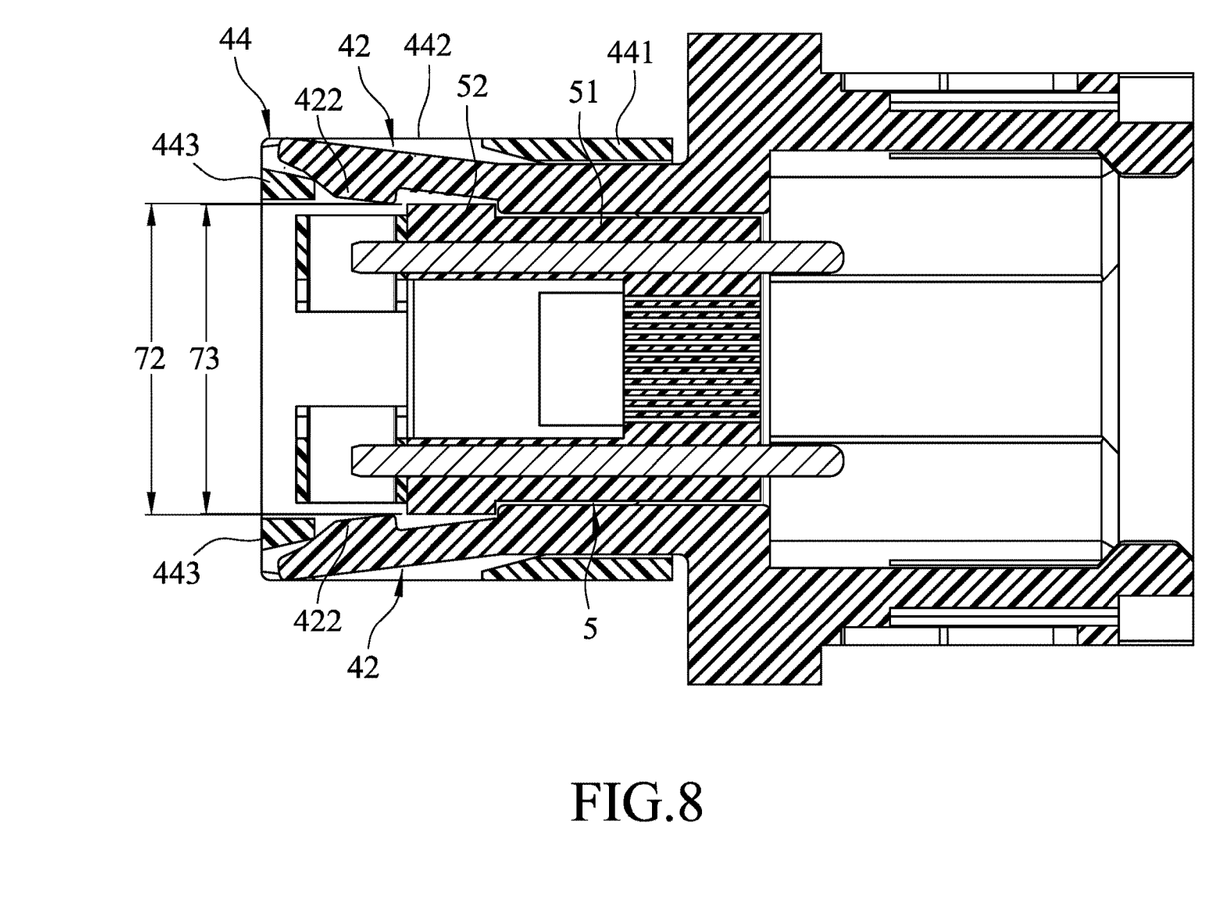
FIG. 8 is a bottom sectional view of the first embodiment in the pushing position.
Figure 9:
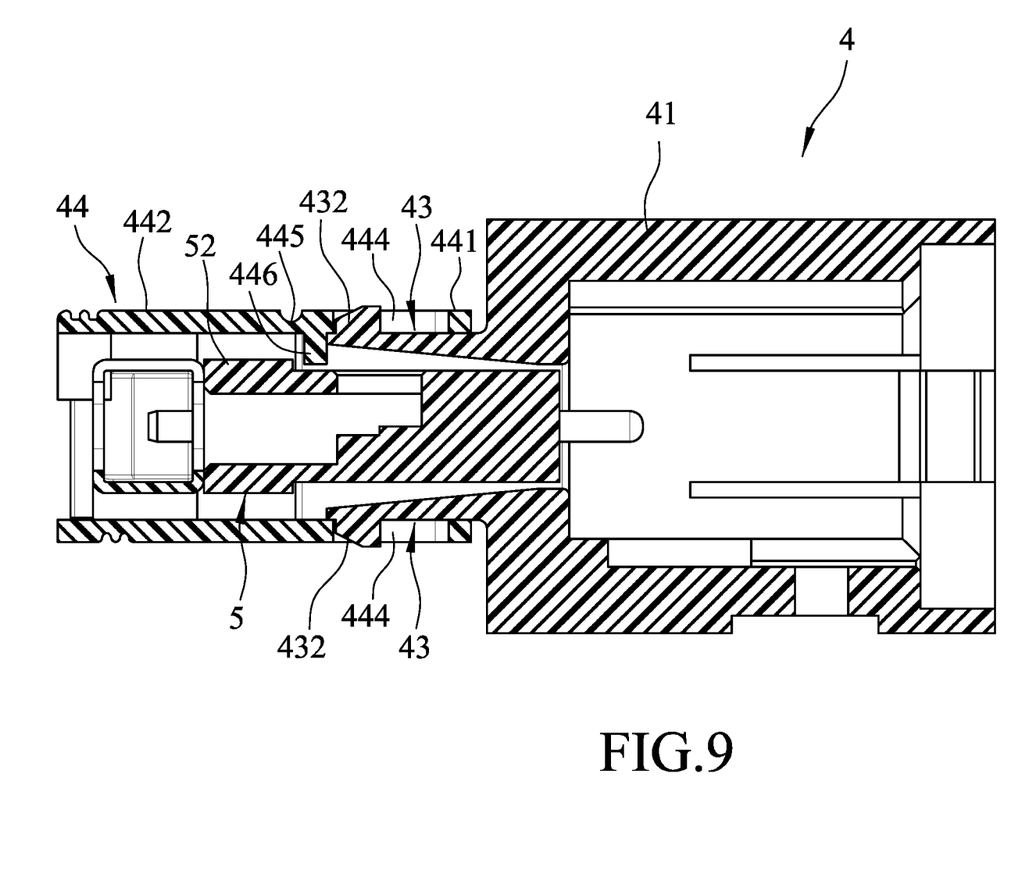
FIG. 9 is a side sectional view of a second embodiment according to a fiber optic adaptor of the disclosure in a non-pushing position.

Referring to FIGS. 7 and 8, in combination with FIG. 4, to detach the ferrule member 5 from the fiber optic adaptor 4, the moving portion 442 is pressed toward the engagement members 42 to move from the non-pushing position to the pushing position (see FIG. 7). As shown in FIGS. 7 and 8, the moving portion 442 is coplanar with the fixing portion 441, and the pushers 443 respectively push the barb elements 422, such that the slanting surfaces 4430 respectively slide on and push the arms 421 to move the engagement members 42 away from each other. The minimum distance 73 between the barb elements 422 is thus enlarged by the pushers 443 so as to be greater than or equal to the width 72 of the pin retainer 52. In this situation, the ferrule member 5 is allowed to be detached from the barb elements 422 and pulled in the first direction 61 away from the housing 41. Therefore, by simply pressing the moving portion 422 to move the engagement members 42 away from each other, the ferrule member 5 can be free from the limitation by the barb elements 422. Without using any tool, the ferrule member 5 can be easily removed from the fiber optic adaptor 4. Therefore, the fiber optic adaptor 4 or the ferrule member 5 can be prevented from being damaged due to improper application forces FIG. 9 illustrates a fiber optic adaptor according to a second embodiment of the disclosure, which has a structure generally similar to that of the first embodiment. However, the auxiliary member 44 further has a baffle block 446 disposed on the inner surface of the fixing portion 441 of the auxiliary member 44.

When the ferrule member 5 is inserted into the fiber optic adaptor 4, the baffle block 446 abuts the pin retainer 52 of the ferrule member 5 to limit continued movement of the ferrule 5.

Further, each through hole 444 of the auxiliary member 4 is elongated in the first direction 61, such that the auxiliary member 44 is movable toward or away from the housing 41 relative to the engagement members 42. Because the studs 432 of the connection members 43 are respectively inserted into the through holes 444, the auxiliary member 44 is prevented from being released from the engagement members 42, the connection members 43 and the housing 41 during movement of the auxiliary member 44.

Figure 10:
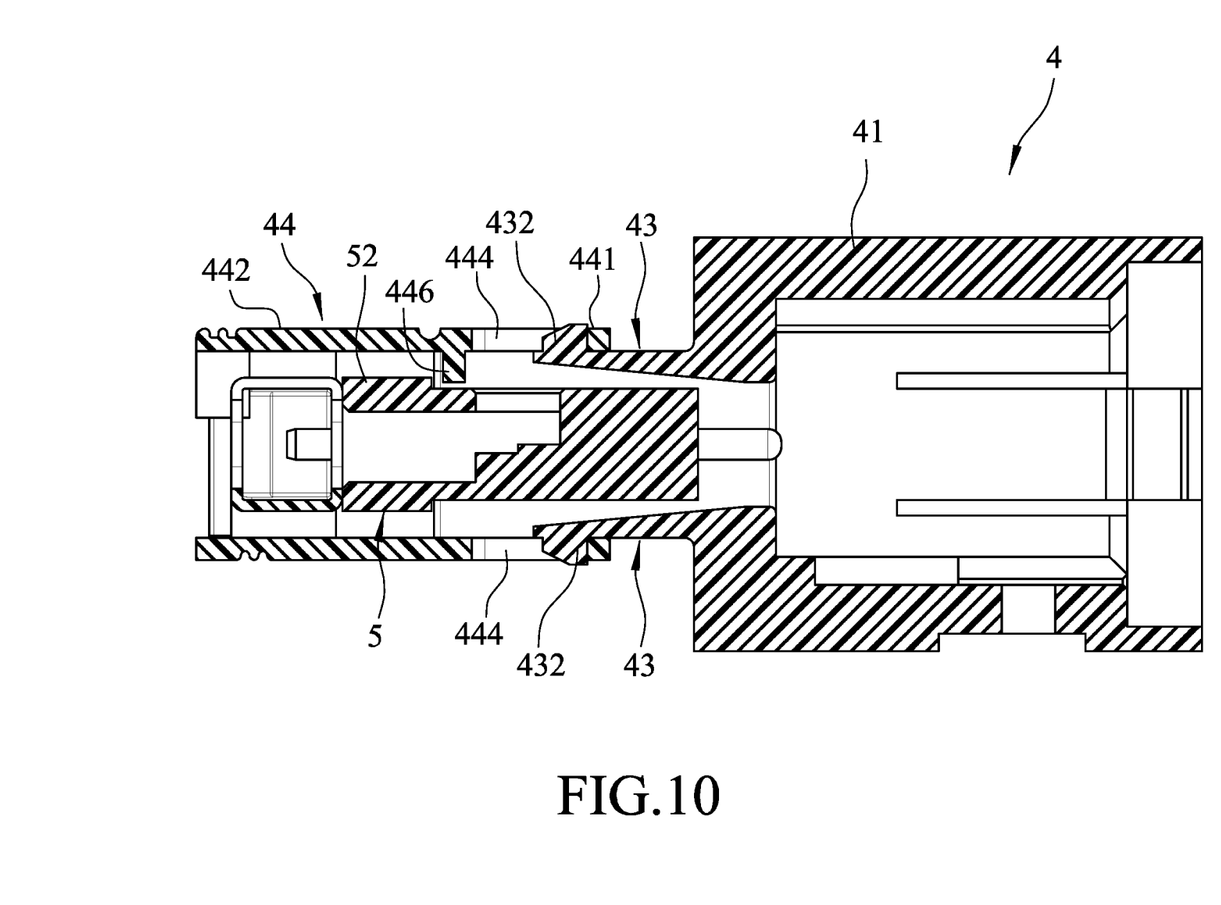
FIG. 10 is a side sectional view of the second embodiment in a pushing position.

Referring to FIG. 10, when the moving portion 442 is pressed downward to move to the pushing position and when the auxiliary member 44 is pulled outward in the first direction 61 away from the housing 41, because the ferrule member 5 is not limited by the engagement members 42, the baffle block 446 pulls the pin retainer 52 to move away from the housing 41. As the pin retainer 52 is moved out of the engagement members 42, the auxiliary member 44 needs not be pressed by the user. Even if the engagement members 42 return to their original positions, the ferrule member 5 can still be removed from the fiber optic adaptor 4. Therefore, by pulling and pressing the auxiliary member 44, the ferrule member 5 can be easily and smoothly removed from the fiber optic adaptor 4 to save disassembly time.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fiber optic adaptor for connecting a ferrule member that has a ferrule main body and an enlarged pin retainer disposed at an end of the ferrule main body, the fiber optic adaptor comprising:
    a housing;
    two engagement members protruding from said housing along a first direction and spaced apart from each other along a second direction transverse to the first direction to clamp the pin retainer, each of said engagement members having a barb element distal from said housing, said barb elements of said engagement members protruding toward each other;
    an auxiliary member disposed around said engagement members and having a fixing portion proximal to said housing, a moving portion proximal to said barb elements and movably connected to said fixing portion, and two pushers protruding from said moving portion towards said barb elements and spaced apart from each other along the second direction, said moving portion being movable relative to said fixing portion between pushing and non-pushing positions;
    wherein, when said moving portion is in the non-pushing position, said pushers do not push said engagement members, and a minimum distance between said barb elements is smaller than a width of the pin retainer to prevent the ferrule member from being detached from said barb elements; and
    wherein, when said moving portion is in the pushing portion, said pushers respectively push said engagement members away from each other to allow detachment of the ferrule member from said barb elements.

2. The fiber optic adaptor as claimed in claim 1, wherein, a distance between said pushers is greater than or equal to the width of the pin retainer.

3. The fiber optic adaptor as claimed in claim 1, wherein each of said engagement members further has an arm that protrudes from said housing along the first direction, said arms of said engagement members respectively having inner surfaces facing toward each other, said barb elements protruding inwardly and respectively from said inner surfaces of said arms.

4. The fiber optic adaptor as claimed in claim 1, wherein said auxiliary member further has a hinging groove that is formed between said fixing portion and said moving portion and that extends in the second direction.

5. The fiber optic adaptor as claimed in claim 3, further comprising two spaced apart connection members that protrude from said housing between said engagement members and that are distal from said barb elements, each of said connection members having two opposite ends respectively connected to said arms of said engagement members distally of said barb elements.

6. The fiber optic adaptor as claimed in claim 5, wherein each of said connection members has a plate shape, said fixing portion of said auxiliary member extending around said engagement members and said connection members, and having two through holes, said connection members respectively having outer surfaces that face an inner surface of said fixing portion, and studs that respectively protrude from said outer surfaces and that are respectively inserted into said through holes.

7. The fiber optic adaptor as claimed in claim 6, wherein each of said through holes is elongated in the first direction such that said auxiliary member is movable toward or away from said housing relative to said engagement members.

8. The fiber optic adaptor as claimed in claim 6, wherein said auxiliary member further has a baffle block disposed on said inner surface of said fixing portion of said auxiliary member and configured to abut the pin retainer of the ferrule member, said baffle block being capable of moving the ferrule main body of the ferrule member away from said housing when said auxiliary member is moved away from said housing.

9. The fiber optic adaptor as claimed in claim 5, wherein each of said engagement members further has a limit part that protrudes from said inner surface of said arm proximally to said housing and that is spaced apart from one of said barb elements in the first direction, a distance between said limit parts of said engagement members being greater than a width of the ferrule main body, and smaller than the width of the pin retainer.

10. The fiber optic adaptor as claimed in claim 9, further comprising four junctions, where said connection members connect said engagement members, and four slits respectively formed at said junctions to facilitate outward bending movements of said arms.

11. The fiber optic adaptor as claimed in claim 10, wherein each of said limit parts is connected to one of said two opposite ends of one of said connection members at one of said junctions, each of said slits being formed between a portion of one of said limit parts and a portion of one of said connection members.

12. The fiber optic adaptor as claimed in claim 1, wherein said moving portion is inclined relative to said fixing portion when said moving portion is in the non-pushing position.

13. The fiber optic adaptor as claimed in claim 5, wherein each of said pushers is formed as a wedge-shaped protrusion, and has a slanting surface that is able to slide on and push one of said arms when said moving portion moves from said non-pushing position to said pushing position.

14. The fiber optic adaptor as claimed in claim 13, wherein each of said pushers further has a tapering end distal from said moving portion, and a pusher inner surface, said pusher inner surfaces of said pushers facing each other, said slanting surfaces of said pushers being respectively opposite to said pusher inner surfaces and convergingly extending from said moving portion to said tapering ends of said pushers, said slanting surface of each of said pushers being slidable on said inner surface of one of said arms.

15. The fiber optic adaptor as claimed in claim 1, wherein each of said pushers is formed as a wedge-shaped protrusion.

* * * * *